US012691632B2

(12) United States Patent
Drexler et al.

(10) Patent No.: US 12,691,632 B2
(45) Date of Patent: Jul. 28, 2026

(54) SYSTEMS AND METHODS FOR APPLYING A TACTILE TEXTURED SUBSTRATE TO A SURFACE OF A STRUCTURE

(71) Applicant: The Boeing Company, Arlington, VA (US)

(72) Inventors: Jason William Drexler, Edmonds, WA (US); Stephanie Iris Metting, Seattle, WA (US); Lloyd Layton Womack, II, Kirkland, WA (US); Bryan Bleda, Edmonds, WA (US); Menelaos Spyridon Kafkalidis, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 90 days.

(21) Appl. No.: 18/619,705

(22) Filed: Mar. 28, 2024

(65) Prior Publication Data

US 2025/0303632 A1      Oct. 2, 2025

(51) Int. Cl.
| | |
|---|---|
| *B29C 64/112* | (2017.01) |
| *B29C 64/209* | (2017.01) |
| *B29C 64/245* | (2017.01) |
| *B29C 64/264* | (2017.01) |
| *B29C 64/30* | (2017.01) |
| *B33Y 10/00* | (2015.01) |
| *B33Y 30/00* | (2015.01) |

(Continued)

(52) U.S. Cl.
CPC .......... *B29C 64/112* (2017.08); *B29C 64/209* (2017.08); *B29C 64/245* (2017.08); *B29C 64/264* (2017.08); *B29C 64/30* (2017.08); *B33Y 10/00* (2014.12); *B33Y 30/00* (2014.12);

*B33Y 40/20* (2020.01); *B33Y 80/00* (2014.12); *B29L 2031/3076* (2013.01); *B64C 1/066* (2013.01)

(58) Field of Classification Search
CPC ..... B29C 64/112; B29C 64/264; B33Y 10/00; B33Y 30/00
See application file for complete search history.

(56) References Cited

U.S. PATENT DOCUMENTS

| | | | |
|---|---|---|---|
| 2013/0316115 A1* | 11/2013 | Smith | ...................... B44C 1/105 |
| | | | 156/60 |
| 2014/0178588 A1* | 6/2014 | Swanson | ............... B29C 64/245 |
| | | | 427/256 |

(Continued)

FOREIGN PATENT DOCUMENTS

| | | |
|---|---|---|
| EP | 1800860 B2 | 6/2016 |
| EP | 3689744 A1 | 8/2020 |
| WO | 2023041434 A1 | 3/2023 |

OTHER PUBLICATIONS

Extended European Search Report for corresponding EP Application No. 25162860.8 dated Aug. 21, 2025 (10 pages).

*Primary Examiner* — Andrew L Swanson
(74) *Attorney, Agent, or Firm* — Mary D. Lawlor; Carroll, Hoette & Butscher, LLC

(57) ABSTRACT

A method includes coupling a substrate with a surface of an aircraft. One or more tactile features are printed onto the substrate. The method can also include forming one or more perforated features onto the substrate, and curing the tactile features with ultraviolet (UV) light. The printing of the tactile features can include controlling, by a control unit, a printer to form the one or more tactile features onto the substrate.

11 Claims, 16 Drawing Sheets

(51) Int. Cl.
    *B33Y 40/20*         (2020.01)
    *B33Y 80/00*         (2015.01)
    *B29L 31/30*         (2006.01)
    *B64C 1/06*          (2006.01)

(56)                  References Cited

U.S. PATENT DOCUMENTS

2014/0311660 A1 * 10/2014 Wimer .................... B32B 37/10
                                             156/212
2020/0299959 A1 *  9/2020 Lozier ................... B32B 15/046
2024/0286307 A1 *  8/2024 Trottnow ............... B26D 1/285

\* cited by examiner

300

302

Forming perforated features on a substrate

304

Printing tactile features onto a surface of the substrate

306

Curing the tactile features with UV light

308

Coupling the substrate with a surface of an aircraft

412

414

406

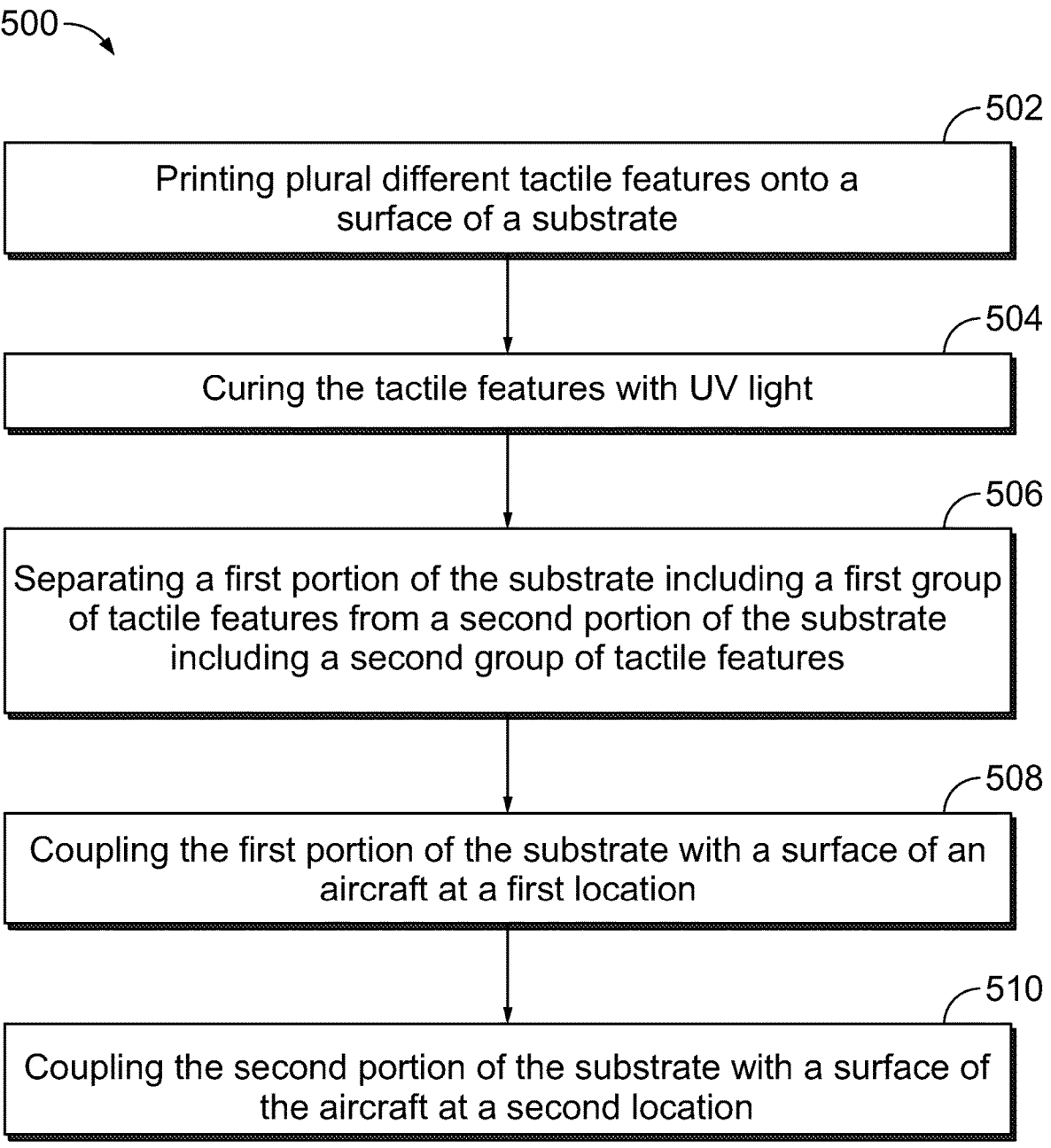

500

502

Printing plural different tactile features onto a
surface of a substrate

504

Curing the tactile features with UV light

506

Separating a first portion of the substrate including a first group
of tactile features from a second portion of the substrate
including a second group of tactile features

508

Coupling the first portion of the substrate with a surface of an
aircraft at a first location

510

Coupling the second portion of the substrate with a surface of
the aircraft at a second location

702
Print a tactile feature onto a surface of a portion of a substrate

704
Cure the tactile features with UV light

706
Couple the substrate with a surface of an aircraft

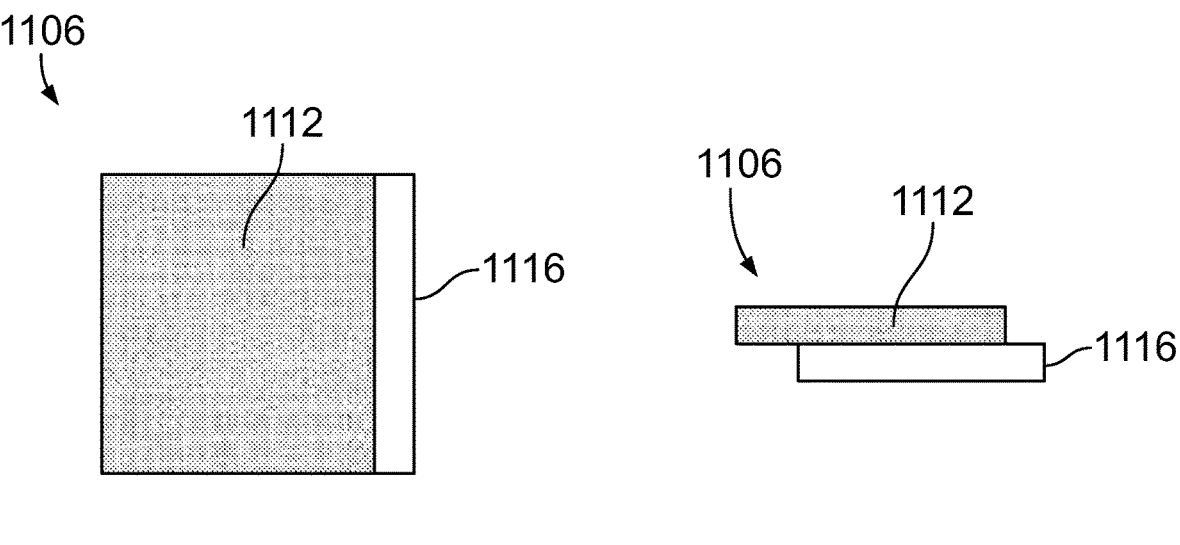
FIG. 12A
FIG. 12B
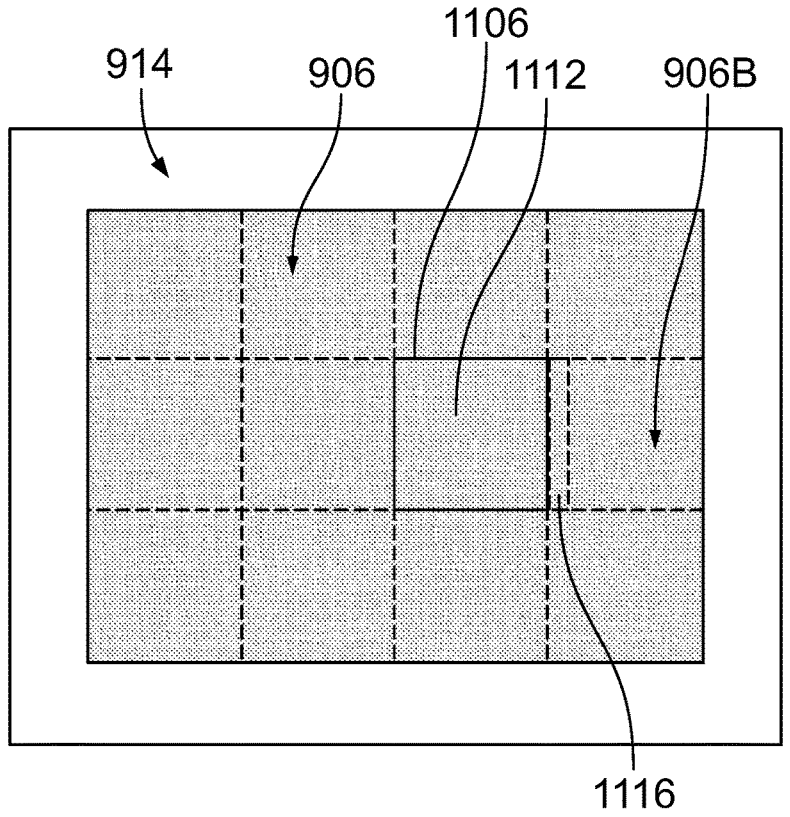
FIG. 12C

SYSTEMS AND METHODS FOR APPLYING A TACTILE TEXTURED SUBSTRATE TO A SURFACE OF A STRUCTURE

FIELD OF THE DISCLOSURE

Examples of the present disclosure generally relate to systems and methods for applying and/or replacing tactile textured substrates on a surface of a structure, such as on or within an aircraft.

BACKGROUND OF THE DISCLOSURE

Traditionally, surfaces of an airplane, such as interior surfaces of the airplane, are covered with laminates that may include decorative textures and/or features printed thereon. These decorative laminates may be formed as sheets and/or rolls of the decorative wall coverings and are applied to a substantial amount of the interior surfaces of the airplane. For example, a decorative wall covering may be applied to an entire surface (or substantially the entire surface) of an interior cabin of the aircraft.

Over time, these laminates may degrade, and need to be replaced. When the laminates degrade, even in relatively small areas of the laminate (e.g., relative to the surface of the aircraft that is covered by the laminate) the entire laminate is typically removed and replaced. As can be appreciated, however, the removal and replacement of an entire laminate from a surface of an aircraft increases cost (e.g., materials, labor, time, etc.) in relation to an airplane.

SUMMARY OF THE DISCLOSURE

A need exists for efficient surface covering management systems within an aircraft. Further, a need exists for an efficient method of removing and/or replacing a substrate (or portions of a substrate) that is coupled with one or more surfaces of an aircraft.

With those needs in mind, certain examples of the present disclosure provide a system and method including coupling a substrate with a surface of an aircraft, wherein one or more tactile features are printed on the substrate. The substrate may be prepared, by one or more steps, prior to the coupling of the substrate with the surface of the aircraft. In at least one example, the substrate may be prepared by forming perforated features onto the substrate, printing the tactile features onto the substrate, and curing the one or more tactile features with ultraviolet (UV) light.

In at least another example, the substrate may be prepared by printing the tactile features onto the substrate, wherein the tactile features are arranged in groups of tactile features; curing the one or more tactile features with UV light; and separating one portion of the substrate including one group of the tactile features from other portions of the substrate including other groups of the tactile features.

In at least another example, the method also includes removing a portion of the substrate from a region of the surface of the aircraft; and coupling a replacement substrate with the region of the surface of the aircraft. The replacement substrate includes one or more attributes that are similar in relation to one or more attributes of the tactile features of the portion of the substrate that was removed from the surface of the aircraft. Optionally, the method may include applying a filler material to a gap that is between the substrate and the replacement substrate. Optionally, the method may include positioning the replacement substrate within the region of the surface of the aircraft to overlap at least some of the substrate that is coupled with the surface of the aircraft.

BRIEF DESCRIPTION OF THE DRAWINGS

FIG. 5 illustrates a flowchart of a method, according to an example of the present disclosure.

FIG. 12A illustrates a top view of a replacement substrate, according to an example of the present disclosure.

FIG. 12B illustrates a side view of the replacement substrate shown in FIG. 12A, according to an example of the present disclosure.

FIG. 12C illustrates the replacement substrate shown in FIGS. 12A and 12B coupled with a surface, according to an example of the present disclosure.

DETAILED DESCRIPTION OF THE DISCLOSURE

Figures 1, 2:
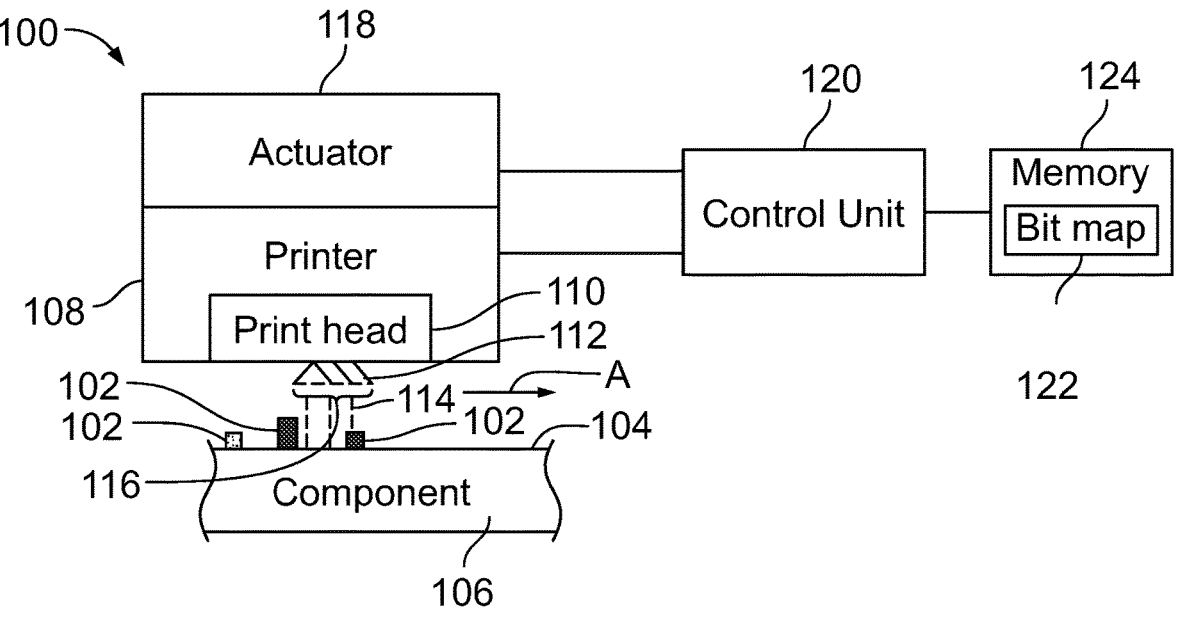
FIG. 1 illustrates a simplified block diagram of a system, according to an example of the present disclosure.
FIG. 2 illustrates a simplified lateral view of a component, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

As described herein, examples of the present disclosure provide systems and methods for preparing a substrate and coupling the substrate with a surface of a vehicle, such as an aircraft. In at least one example, the substrate includes one or more tactile features having one or more attributes printed onto a surface of the substrate. The printing can include one or more passes to form the textured features. The substrate having the one or more tactile features may be coupled with the surface of the vehicle, such as an interior surface of the aircraft.

Examples of the present disclosure provide methods for preparing the substrate to be coupled with the interior surface of the aircraft. The method can include forming perforated features onto the substrate, printing the tactile features onto the substrate, and curing the one or more tactile features with ultraviolet (UV) light.

In at least one example, the method can include printing the tactile features onto the substrate, wherein the tactile features are arranged in groups of tactile features; curing the one or more tactile features with UV light; and separating one portion of the substrate including one group of the tactile features from other portions of the substrate including other groups of the tactile features.

Optionally, a first portion of the substrate includes a first group of tactile features having first attribute(s), and a second portion of the substrate includes a second group of tactile features having second attribute(s). The first portion of the substrate having the first attributes may be coupled with the surface of the aircraft at a first location of the aircraft, and the second portion of the substrate having the second attributes may be coupled with the surface of the aircraft at a second location of the aircraft.

In at least one example, a portion of the substrate is removed from a region of the surface of the aircraft; and a replacement substrate is coupled with the region of the surface of the aircraft. The replacement substrate includes one or more attributes that are similar in relation to one or more attributes of the tactile features of the portion of the substrate that was removed from the surface of the aircraft.

Optionally, the method may include applying a filler material to a gap that is between the substrate and the replacement substrate. Optionally, the method may include positioning the replacement substrate within the region of the surface of the aircraft to overlap at least some of the substrate that is coupled with the surface of the aircraft.

In at least one example, the substrate and/or the replacement substrate may be coupled with the surface of the aircraft via an adhesive material. The adhesive material may be disposed between the substrate and the surface of the aircraft, may be sprayed and or applied to an exterior surface of the substrate, or the like. Optionally, the substrate and/or the replacement substrate may be coupled with the surface of the aircraft via one or more mechanical fasteners and/or fastener methods.

Certain examples of the present disclosure provide a system that includes a substrate that is coupled with a surface of an aircraft. The substrate includes one or more tactile features printed onto the substrate.

Examples of the present disclosure provide a printer that includes a print head, and a control unit that controls operation of the printer to form the tactile features on the substrate. The tactile features may be arranged in groups of tactile features in which the different groups of the tactile features include one or more different attributes.

In at least one example, a first portion of the substrate including one group of the tactile features is separated from a second portion of the substrate that includes other groups of the tactile features. Optionally, the first portion of the substrate includes a first group of tactile features having first attributes, and a second portion of the substrate includes a second group of tactile features having second attributes. The first portion of the substrate that includes the first group of tactile features is coupled with the surface of the aircraft at a first location, and the second portion of the substrate that includes the second group of tactile features is coupled with the surface of the aircraft at a second location.

In at least one example, a portion of the substrate is removed from a region of the surface of the aircraft, and a replacement substrate is coupled with the region of the surface of the aircraft. The replacement substrate includes one or more tactile features that have one or more attributes that are similar in relation to the one or more attributes of the tactile features of the portion of the substrate that is removed from the surface of the aircraft. In at least one example, a filler material is applied to a gap between the replacement substrate and the substrate. In at least one example, the replacement substrate is positioned to overlap with at least some of the substrate that is coupled with the surface of the aircraft.

Certain examples of the present disclosure provide a method that includes coupling a substrate having one or more tactile features with a surface of an aircraft. A portion of the substrate is removed from a region of the surface of the aircraft. The shape and/or size of the portion of the substrate that is removed is based at least in part on a location of one or more perforated features of the substrate. A replacement substrate is coupled with the region of the surface of the aircraft. The replacement substrate includes one or more attributes that are similar in relation to one or more attributes of the tactile features of the portion of the substrate that is removed from the region of the surface of the aircraft.

FIG. 1 illustrates a simplified block diagram of a system 100, according to an example of the present disclosure. The system 100 is configured to print one or more tactile features 102 on a surface 104 of a component 106. In at least one example, the component 106 is a substrate such as paper, a panel, a fabric, or the like, that may be coupled with a portion of a vehicle, such as an aircraft. For example, the substrate may be coupled with a surface of an internal cabin of the vehicle, such as a wall, ceiling, floor, or the like, within the vehicle. As another example, the substrate may be coupled with an exterior portion of the vehicle, such as an outer surface of a fuselage, a wing, or the like. As one example, the substrate may be a flat or planar component or may be a non-planar surface. In one example, the substrate may be in the form of a sheet or alternatively the substrate may be flexible material that is held and/or stored in a roll, such as a roll of fabric or paper material. For example, the substrate may be unrolled or opened in order to print the tactile features 102 thereon, and may be re-rolled or re-wrapped subsequent to the printing of the tactile features 102.

The system 100 includes a printer 108 having a print head 110, which includes one or more nozzles 112 configured to deposit ink 114 onto the surface 104. In at least one example, the print head 110 includes a single nozzle 112. As another example, the print head 110 includes two, three, four, five, or more nozzles 112. A swath 116 of the print head 110 is a width across the one or more nozzles 112.

The printer 108 is coupled to an actuator 118, which is configured to move the print head 110. In at least one example, the print head 110 includes a single axis servo motor having a linear actuator. The actuator 118 is configured to move the print head 110 over a pass in relation to the surface 104 of the component or substrate 106. The actuator 118 can be separate and distinct from the printer 108. As another example, the printer 108 includes the actuator 118.

A control unit 120 is in communication with the printer 108 and the actuator 118, such as through one or more wired or wireless connections. The control unit 120 is configured to operate the actuator 118 and the printer 108 to form the tactile features 102 on the surface 104 of the component 106 based on data 122 stored within a memory 124 that is communication with the control unit 120, such as through one or more wired or wireless connections. For example, the data 122 can be a bit map of the tactile features 102 to be formed on the surface 104 of the component 106. The memory 124 can be separate and distinct from the control unit 120. As another example, the control unit 120 includes the memory 124.

In operation, in order to form the tactile features 102, the printer 108 is moved in a single pass in the direction of arrow A (such as from left to right, right to left, top to bottom, or bottom to top) in relation to the surface 104. The control unit 120 controls operation of the printer 108 to deposit the ink 114 onto the surface 104 to form the tactile features 102 during the single pass of the printer 108. In order to form the tactile features 102 having different attributes (such a heights and widths), the control unit varies the speed of the printer 108 in the direction of arrow A during the single pass, instead of operating the printer over multiple passes.

In at least one example, a digital inkjet printer provides the printing, such as via texture printing with UV curable inks, to create protruded features on the surface 104 of the component 106, which can be a decorative laminate or other substrate. For example, the ink 114 may be an ultraviolet (UV) curable ink, and the tactile features may be formed by the printer 108 applying UV curable ink to the surface 104. The one or more tactile features may be cured with ultraviolet (UV) light, such as emitted by a UV light emitting device (not shown). Optionally, one or more of the tactile feature can be printed on the surface 104 and not cured with UV light.

FIG. 2 illustrates a simplified lateral view of the component 106, according to an example of the present disclosure. Referring to FIGS. 1 and 2, the control unit 120 operates the printer 108 to form the tactile features 102a and 102b during a single pass of the print head 110 in the direction of arrow A. As shown, the tactile feature 102a has a first width W1 along a portion of the surface 104, and a first height H1 above the surface 104. The tactile feature 102a has a second width W2 along a portion of the surface 104, and a second height H2 above the surface 104. The first width W1 differs from the second width W2. As shown, the first width W1 is greater than the second width W2. The first height H1 differs from the second height H2. As shown, the first height H1 is less than the second height H2.

The control unit 120 may operate the printer 108 to form tactile features 102 having different attributes (e.g., varying heights and/or widths) on the surface 104 of the component 106. For example, the control unit 120 may control one or more operations of the actuator 118 to control the height and/or width of the tactile features.

As one example, in order to form a taller tactile feature, such as the tactile feature 102B, the control unit 120 may control operation of the print head 110 to print multiple layers during plural passes of the print head 110. In one example, the print head 110 may be controlled to make multiple passes and print multiple layers of material to form the tactile feature 102B having the second height H2 while the print head 110 moves in the direction A. As another example, the print head 110 may move in the direction A and then in a reverse direction, and may print a layer of material onto the component 106 with each back and forth pass of the print head 110. Optionally, the print head 110 may print the one or more layers onto the component 106 in an alternative arrangement of movements. In contrast, in order to form a shorter tactile feature, such as the tactile feature 102A, the control unit may control operation of the print head to have a reduced number of passes and/or to form the feature with fewer layers relative to the tactile feature 102B.

In an alternative arrangement, the height and/or width of the tactile features 102 may be based on a speed of movement of the print head 110 during a single pass in the direction of arrow A. For example, the height and/or width of each of the tactile features 102A, 102B may be based on one or more of a speed of movement of the print head 110 and/or the concentration of ink droplets being dispersed by the print head 110 may print or disperse ink droplets to form the tactile features.

For example, in order to form a taller tactile feature having a thinner width, such as the tactile feature 102b, the control unit 120 decreases the speed of the print head 110 during the single pass in the direction of arrow A, thereby concentrating more ink droplets at a tighter location. Consequently, the ink droplets form the higher, thinner tactile feature 102b. In contrast, in order to form a shorter tactile feature having a greater width, the control unit increases the speed of the print head 110 during the single pass in the direction of arrow A, thereby spreading the ink droplets over a wider area, and which reduces the build-up in height. In this manner, the control unit 120 operates the printer 108 to form tactile features 102 having different attributes (such as different heights and/or widths) on the surface 104 of the component 106 by varying the speed of the print head 110, as controlled by the actuator 118, during the single pass in the direction of arrow A.

FIGS. 1 and 2 illustrate one example of a printing system for printing one or more tactile features onto a component and are for illustrative and example purposes only. Optionally, the tactile features may be printed onto the component via an alternative printing system and/or alternative printing method.

Figure 3:
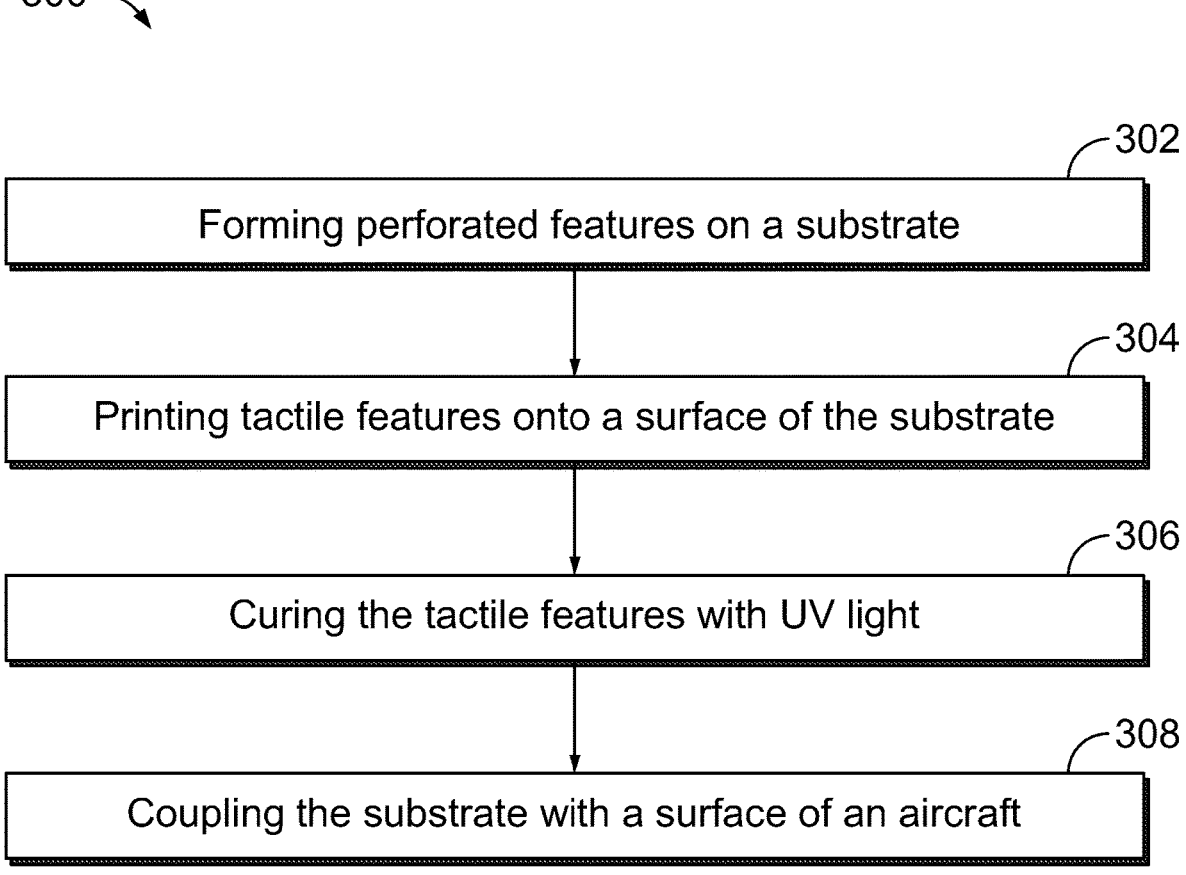
FIG. 3 illustrates a flowchart of a method, according to an example of the present disclosure.
Figure 4A:
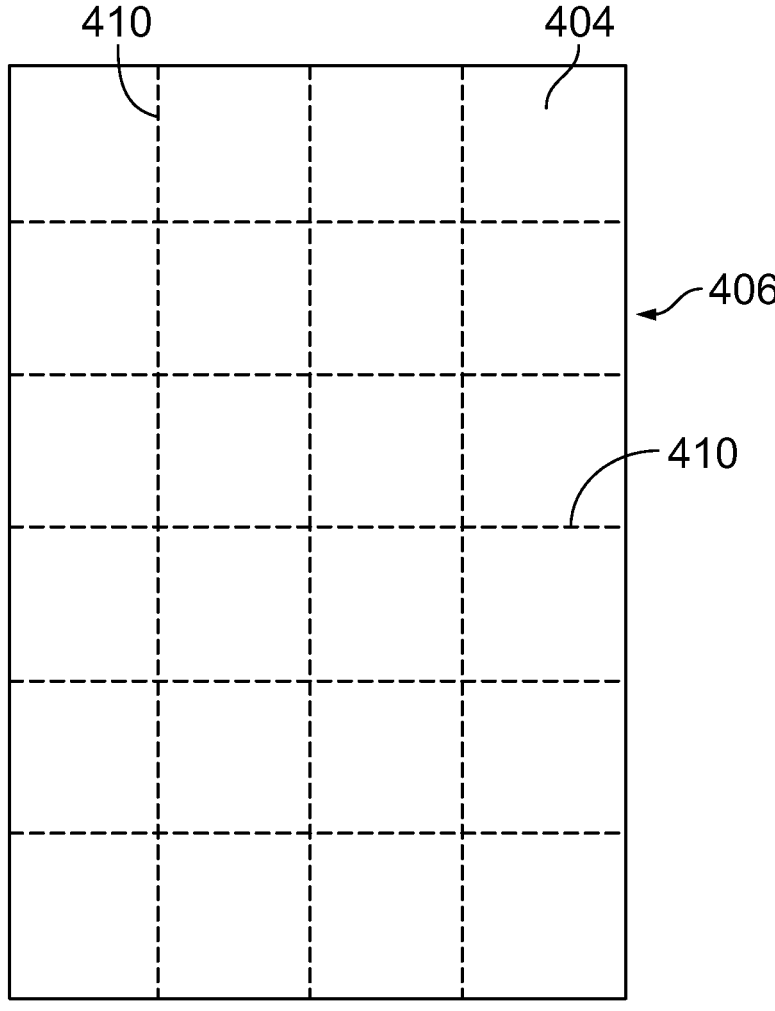
FIG. 4A illustrates a front view of a substrate subsequent to a first treatment operation, according to an example of the present disclosure.
Figure 4B:
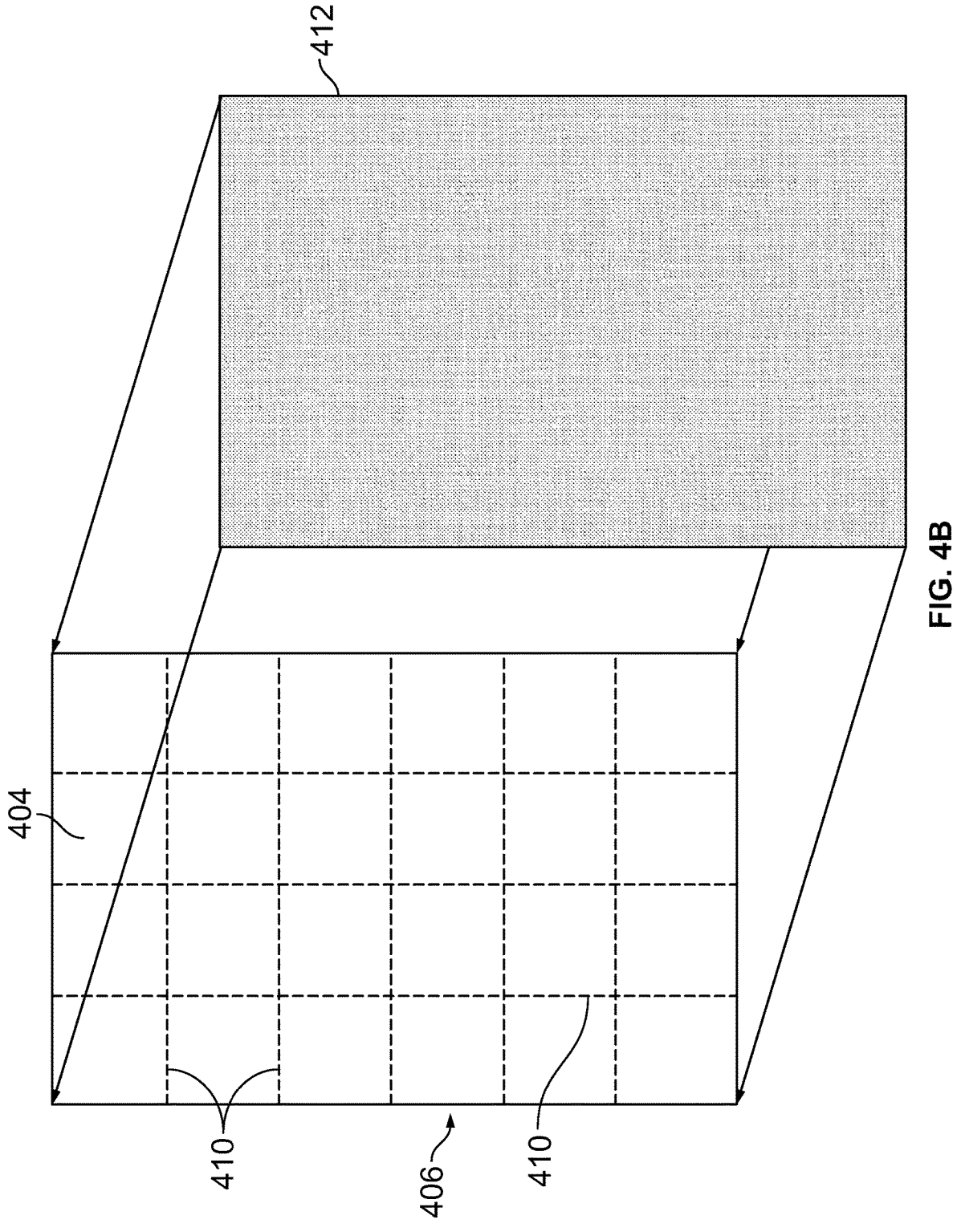
FIG. 4B illustrates a second treatment operation of the substrate shown in FIG. 4A, according to an example of the present disclosure.
Figure 4C:
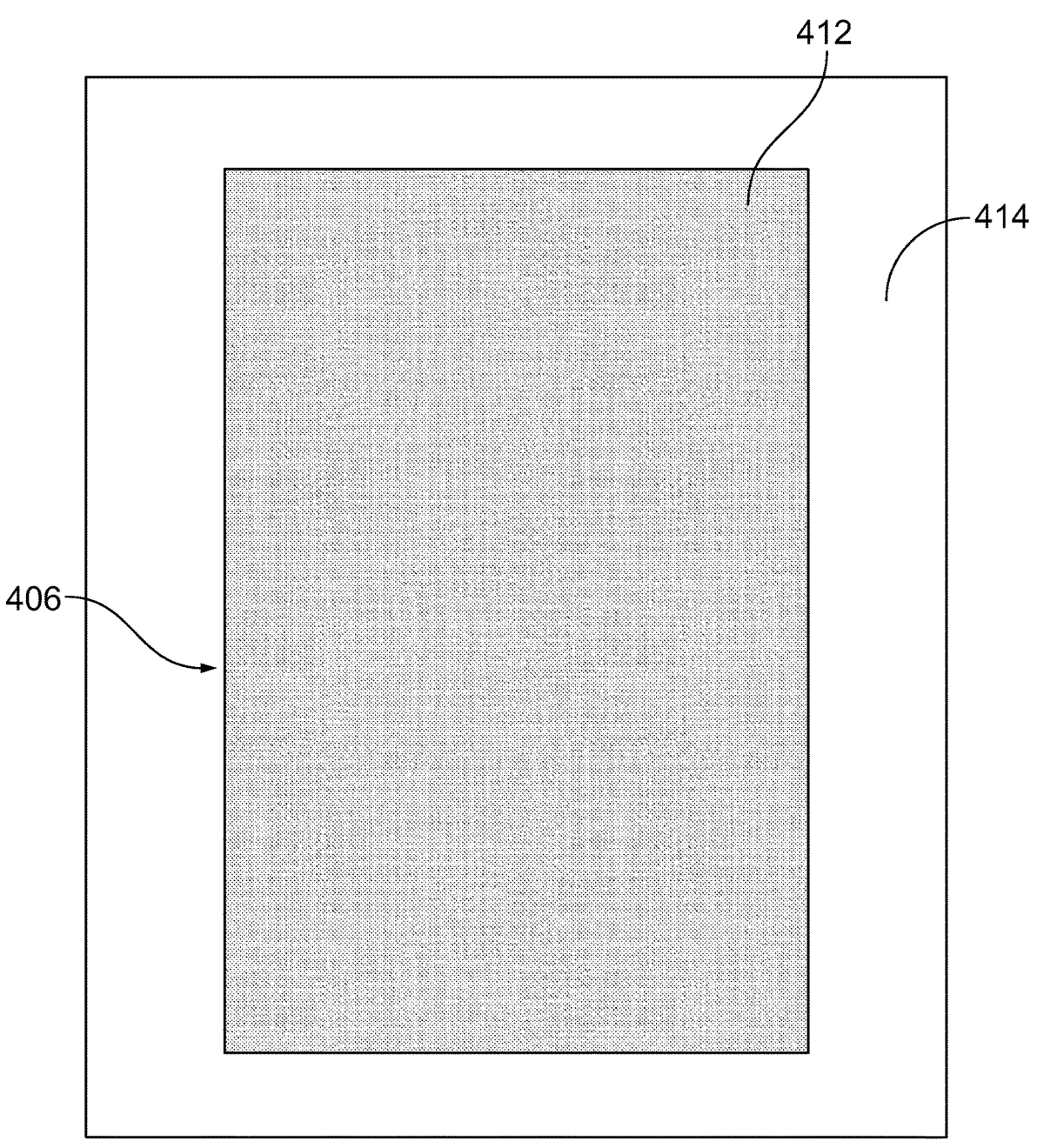
FIG. 4C illustrates a front view of the substrate to be coupled with a component, according to an example of the present disclosure.

FIG. 3 illustrates a flow chart 300 of a method of preparing a substrate to be coupled with a surface of an aircraft, according to an example of the present disclosure. FIG. 4A illustrates a front view of a substrate 406 subsequent to a first treatment operation, according to an example of the present disclosure. FIG. 4B illustrates a second treatment operation of the substrate 406. FIG. 4C illustrates a third treatment operation of the substrate 406.

Referring to FIGS. 3 and 4A-4C, at 302, one or more perforated features 410 may be formed onto a substrate 406, onto a surface 404 of the substrate, or the like. In the illustrated example shown in FIGS. 4A-4C, the perforated features are arranged in rows and columns forming plural squares within the substrate having substantially uniform shapes and sizes. In alternative embodiments, the perforated features may be formed such as to create different portions of the substrate having uniform and/or unique shapes and/or sizes. For example, one or more of the perforated features may be arranged to create a wavy or curved perforated line, may be arranged to create a curved portion of the substrate 406, or the like. Optionally, the method may not include 302 and perforated features may not be formed onto the substrate 406.

At 304, one or more tactile features 412 may be printed onto the surface 404 of the substrate 406. For example, referring to FIGS. 1 and 2, the control unit 120 may control operation of the printer 108 to deposit the ink 114 from the print head 110 onto the surface 404 of the substrate 406. In the illustrated example, the tactile features 412 that are printed onto the surface 404 of the substrate 406 have common attributes. For example, the tactile features that are printed onto the substrate have substantially uniform heights, widths, imagery, textures, colors, etc., such as to form a substantially uniform across the surface of the substrate. The textures, imagery, colors, design, arrangement, and/or other attributes of the tactile features may be based on a location of the aircraft that may receive the substrate. In one or more examples, a size (e.g., width, length, etc.) of the substrate may be based at least in part on the location of the aircraft that may receive the substrate.

At 306, the one or more tactile features 412 are cured with ultraviolet (UV) light, such as emitted by a UV light emitting device. Optionally, the method may not include 306. Instead, the feature(s) can be printed on the surface 404 of the substrate 406 and not cured with UV light.

At 308, the substrate 406 including the tactile features 412 printed thereon is coupled with a surface 414 of a vehicle, such as an aircraft. In one or more examples, the substrate 406 may be coupled with the surface of the aircraft via an adhesive material disposed between the substrate and the surface of the aircraft (e.g., a pressure-sensitive adhesive, a hot melt adhesive, etc.), via a mechanical fastener device and/or component, an adhesive material that may be sprayed onto, brushed onto, or otherwise applied to the substrate, or the like.

Figure 6A:
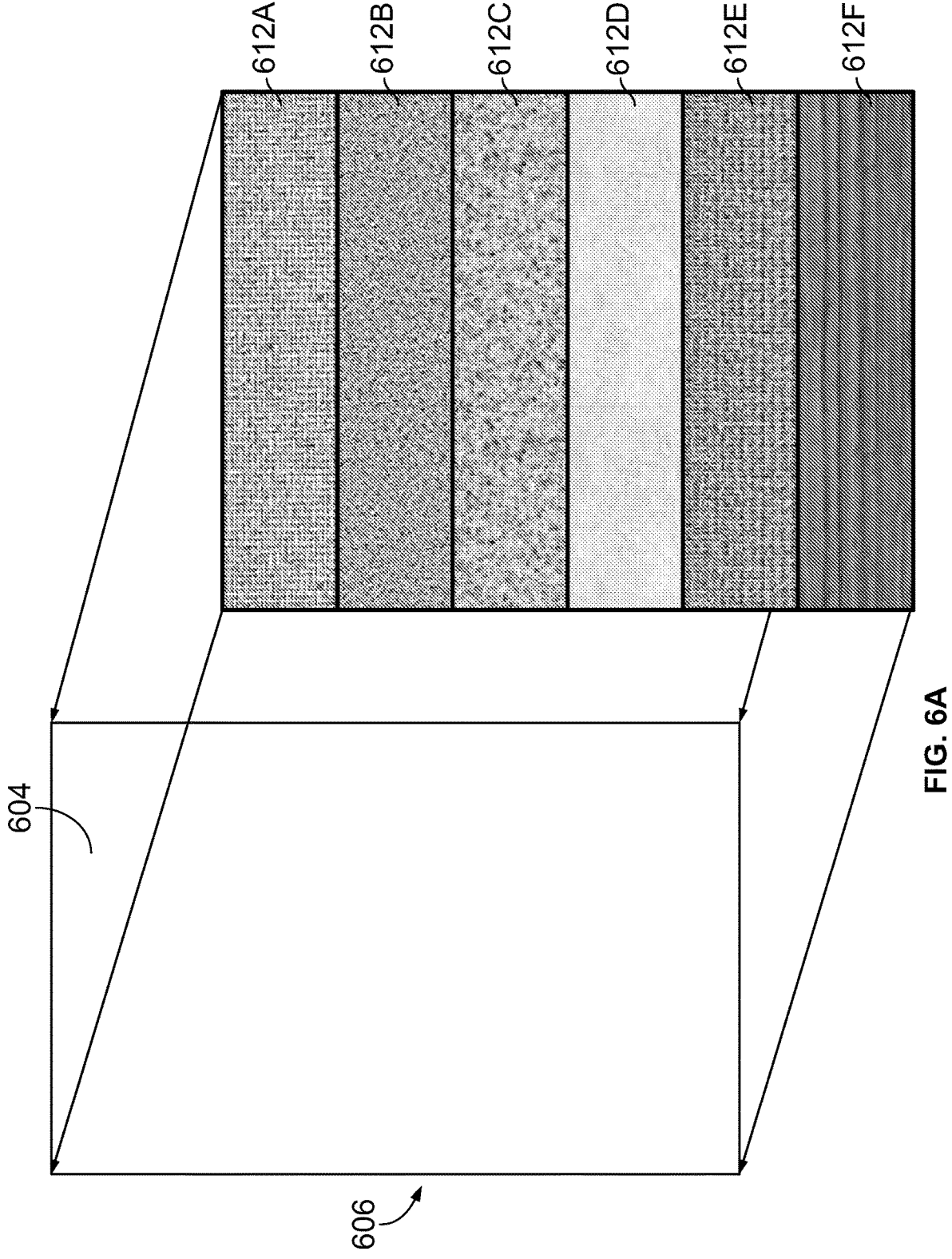
FIG. 6A illustrates a first treatment operation of a substrate, according to an example of the present disclosure.
Figure 6B:
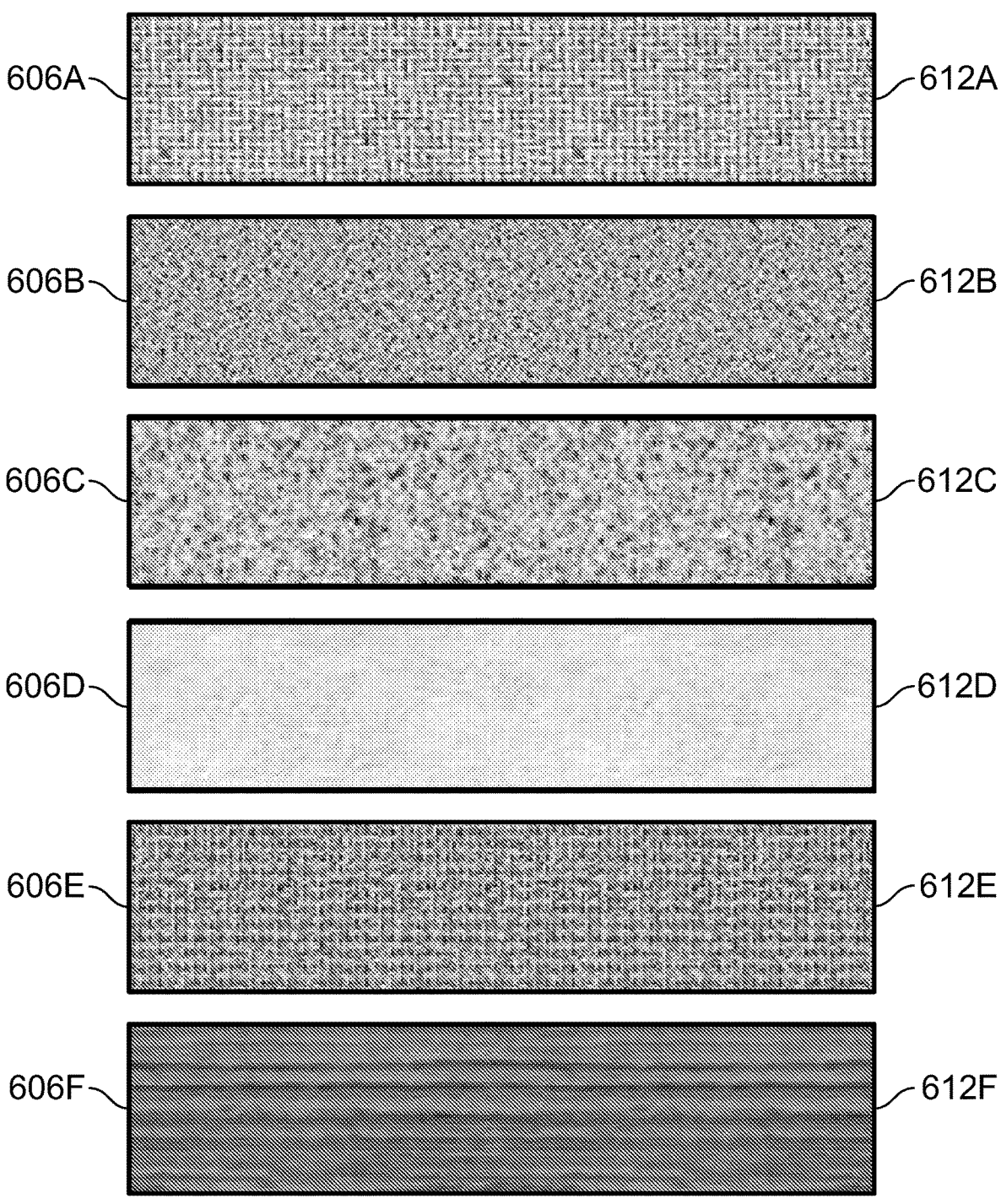
FIG. 6B illustrates a second treatment operation of the substrate shown in FIG. 6A, according to an example of the present disclosure.

FIG. 5 illustrates a flow chart 500 of a method of preparing a substrate to be coupled with a surface of an aircraft, according to another example of the present disclosure. FIG. 6A illustrates a first treatment operation of a substrate 606, according to an example of the present disclosure. FIG. 6B illustrates a second treatment operation of the substrate 606, according to an example of the present disclosure.

Referring to FIGS. 5, 6A, and 6B, at 502, plural different tactile features 612A-F may be printed onto a surface 604 of a substrate 606. For example, plural different tactile features 612A-F may be printed on a continuous substrate 606. The plural different tactile features 612A-F may be arranged in groups of tactile features and each of the different groups of tactile features 612A-F may have one or more attributes (e.g., different textured features, different colors, different imagery, etc.) that differ from one or more attributes of the other tactile features.

At 504, the plural tactile features 612A-F are cured with ultraviolet (UV) light, such as emitted by a UV light emitting device. Optionally, the method may not include 504. Instead, the feature(s) can be printed on the surface 604 of the substrate 606 and not cured with UV light.

At 506, one or more portions of the substrate may be separated from one or more other portions of the substrate. For example, the continuous substrate 606, having the plural different tactile features 612A-F printed thereon, may be separated or cut into smaller sizes and/or different portions of the substrate. In the illustrated example, a first portion 606A of the substrate includes a first group of tactile features 612A, a second portion 606B of the substrate includes a second group of tactile features 612B, a third portion 606C of the substrate includes a third group of tactile features 612C, a fourth portion 606D of the substrate includes a fourth group of tactile features 612D, a fifth portion 606E of the substrate includes a fifth group of tactile features 612E, and a sixth portion 606F of the substrate includes a sixth group of tactile features 612F. One or more of the portions of the substrate may be separated from one or more other portions of the substrate 606, such as by a cutting or shearing operation of the substrate.

At 508, the first portion 606A of the substrate that includes the first group of tactile features 612A may be coupled with a surface of the vehicle (e.g., the aircraft) at a first location of the vehicle. For example, the first portion 606A of the substrate may be coupled with a surface of a portion of an interior cabin of the aircraft. At 510, the second portion 606B of the substrate that includes the second group of tactile features 612B may be coupled with a surface of the vehicle (e.g., the aircraft) at a different, second location of the vehicle. For example, the second portion 606B of the substrate may be coupled with a surface of a portion of a lavatory wall of the aircraft. The different portions of the substrate may be coupled with the different surfaces of the aircraft via one or more coupling methods and/or fastening mechanisms such as, but not limited to, an adhesive material (e.g., a pressure-sensitive adhesive, a hot melt adhesive, a spray-on adhesive, a brushed-on adhesive, or the like), a mechanical fastener device (e.g., hook-and-loop material, nails, screws, staples, rivets, or the like), or the like.

Figure 7:
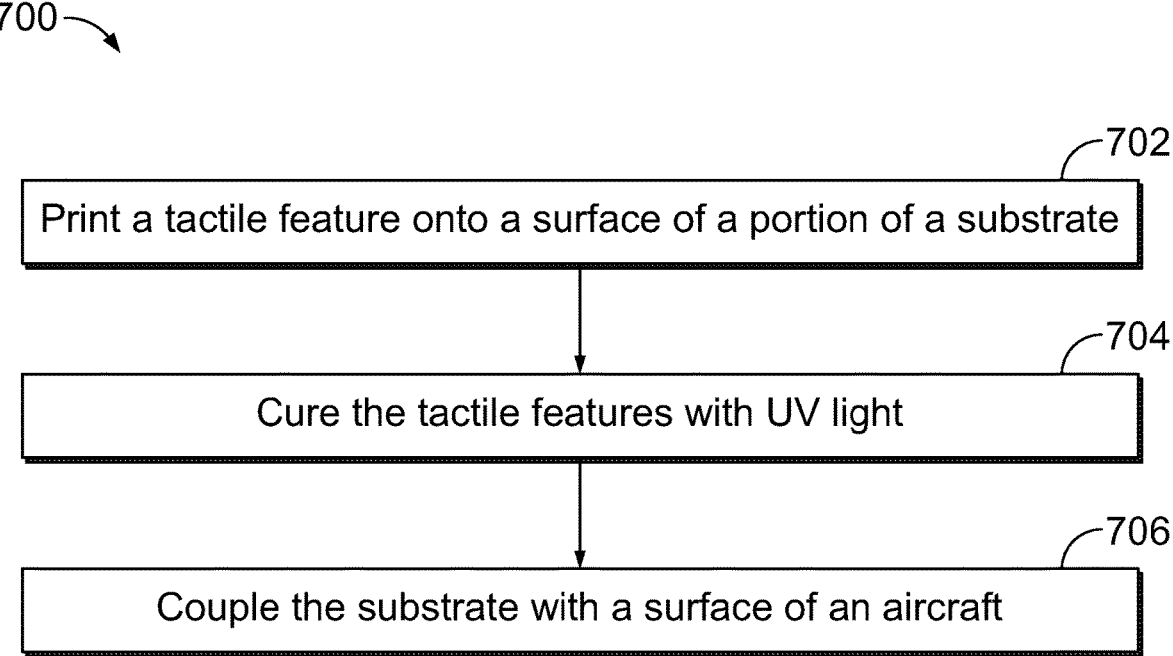
FIG. 7 illustrates a flowchart of a method, according to an example of the present disclosure.
Figure 8:
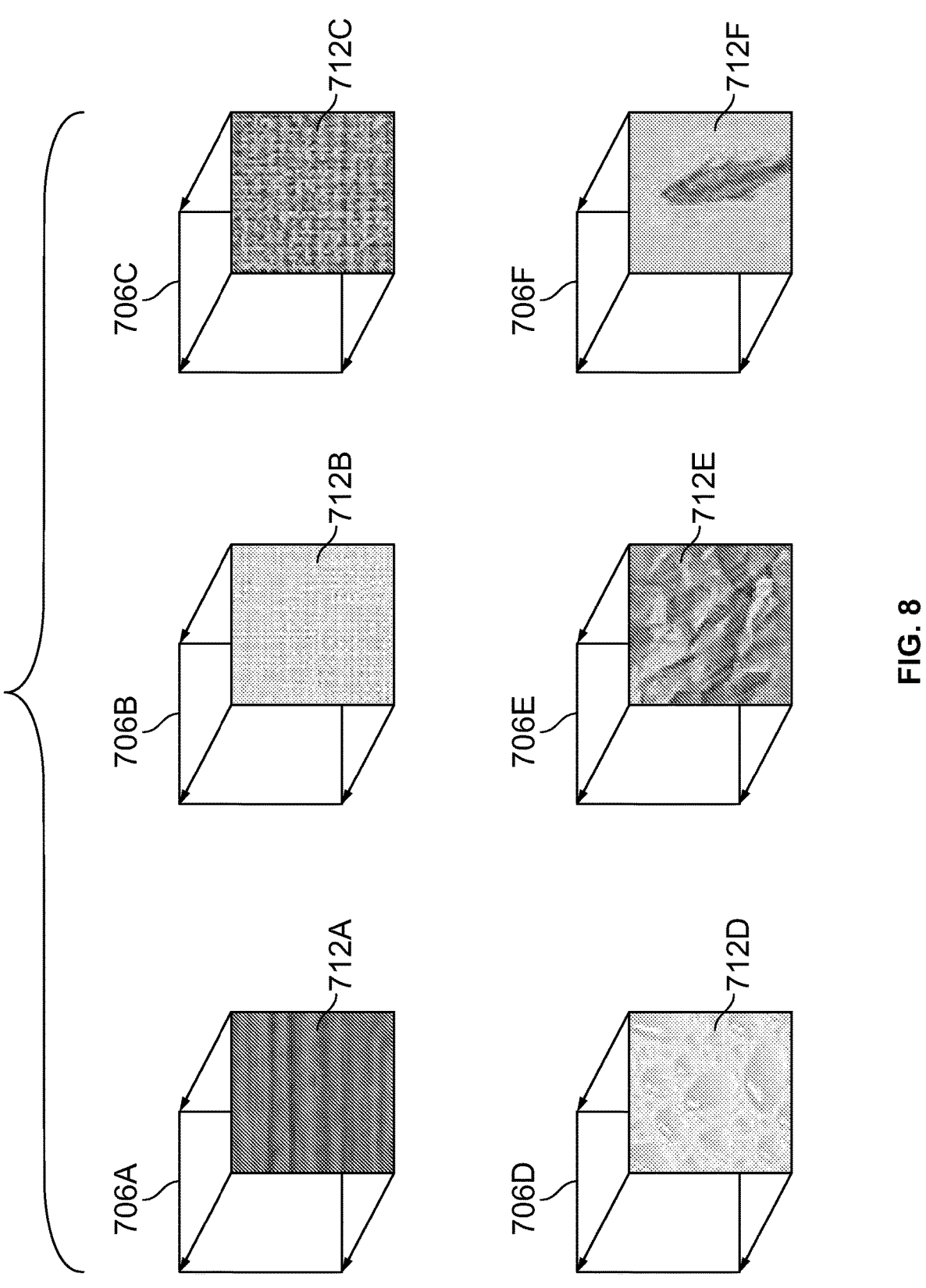
FIG. 8 illustrates a treatment operation of plural substrates, according to an example of the present disclosure.

FIG. 7 illustrates a flow chart 700 of a method of preparing a substrate to be coupled with a surface of an aircraft, according to another example of the present disclosure. FIG. 8 illustrates a treatment operation of plural substrates 706A-F, according to an example of the present disclosure.

Referring to FIGS. 7 and 8, at 702, one of plural tactile feature 712A-F may be printed onto one of the plural substrates 706A-F. For example, instead of printing the tactile features onto a continuous substrate (e.g., as shown in FIG. 6A), individual tactile features 712A-F may be printed onto the plural individual substrates 706A-F.

At 704, the plural tactile features 712A-F are cured with ultraviolet (UV) light, such as emitted by a UV light emitting device. Optionally, the method may not include 704. Instead, the feature(s) can be printed on surfaces of the individual substrates 706A-F and not cured with UV light. At 706, one or more of the individual substrates 706A-F may be coupled with different surfaces of the aircraft.

Figures 9, 10:
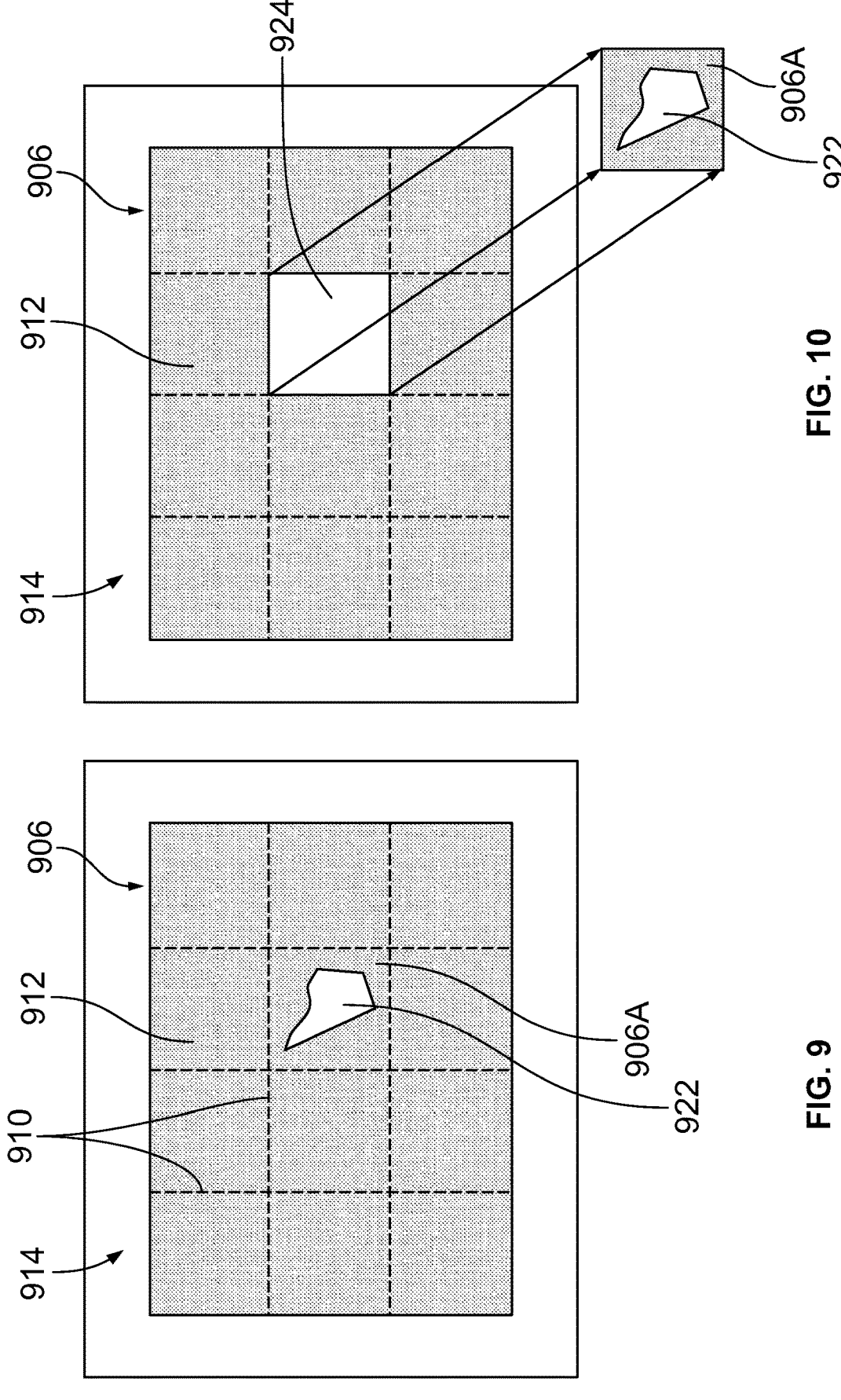
FIG. 9 illustrates of a portion of a substrate on a surface to be replaced, according to an example of the present disclosure.
FIG. 10 illustrates a replacement substrate to be coupled with a surface, according to an example of the present disclosure.

In one or more examples, a portion of a substrate (e.g., including one or more tactile features printed thereon) that is coupled with a surface of the aircraft may be degrade (e.g., due to normal or typical wear and tear of the substrate, etc.) and may need to be removed and replaced. FIGS. 9 and 10 illustrate a substrate 906 that is coupled with a surface 914 of an aircraft. The substrate 906 includes tactile features 912 that have been printed thereon. In the illustrated example, the substrate 906 includes plural perforated features 910 that have been formed onto the substrate 906 and identifies plural different regions of the substrate. The perforated features 910 are shown in FIGS. 9 and 10 for illustrative purposes only, however, the perforated features 910 may not be visible while the substrate 906 is coupled with the surface 914 of the aircraft. For example, the substrate 906 may cover up, or substantially cover up, the perforated features 910 so that a passenger of the aircraft may be unable to see the perforated features 910 (e.g., with the naked eye, with no magnification, etc.). In another example, the substrate may be devoid the perforated features.

In one example, an area 922 of at least one portion 906A of the substrate 906 may degrade, such as to a level of degradation that requires replacement and/or repair of the substrate. For example, the area 922 may be degraded by at least some of the tactile features being removed from the substrate (e.g., worn off, scraped away, or the like), by some of the substrate being separated from the surface of the aircraft, or the like. As shown in FIG. 10, the portion 906A of the substrate 906 may be removed from the surface 914 of the aircraft. For example, only the degraded portion of the substrate may be removed (e.g., along the perforated lines, or along other cutting or separating lines) and the non-degraded portion of the substrate may remain coupled with the surface 914 of the aircraft. Removing the portion 906A of the substrate may expose a region 924 of the surface 914 of the aircraft.

Figure 11:
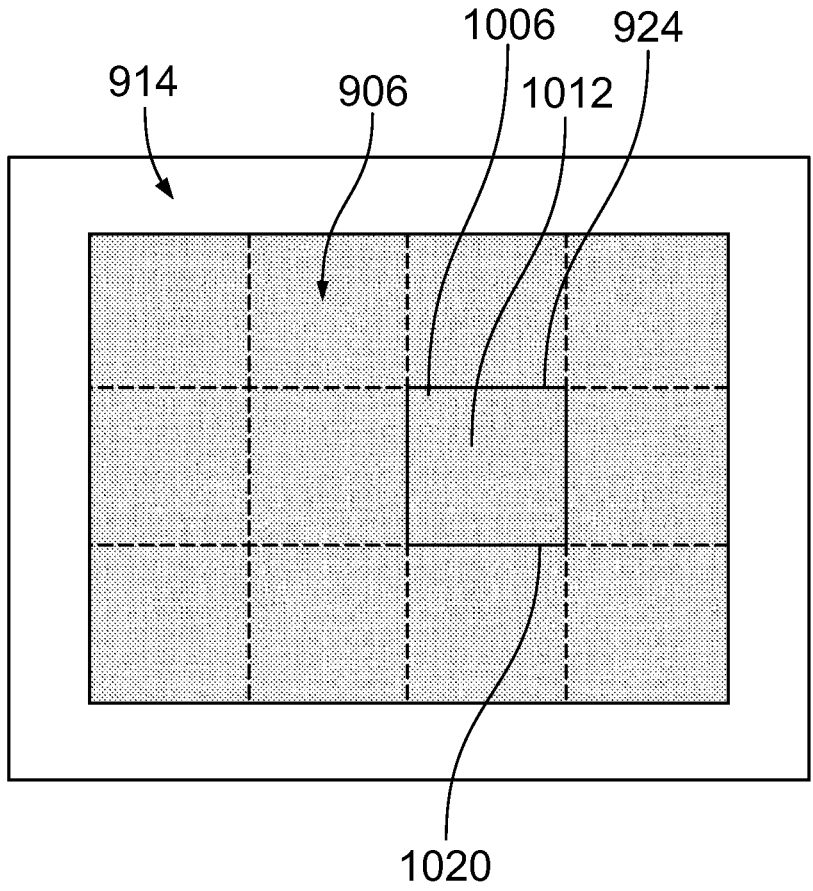
FIG. 11 illustrates a replacement substrate coupled with a surface, according to an example of the present disclosure.

FIG. 11 illustrates one example for replacing the degraded and removed portion 906A of the substrate shown in FIGS. 9 and 10, according to one example of the present disclosure. In one example, a replacement substrate 1006 may be coupled with the region 924 of the surface 914 of the aircraft via an adhesive and/or mechanical fastening mechanism. The replacement substrate 1006 includes one or more tactile features 1012 having one or more attributes that are similar in relation to the one or more attributes of the tactile features of the portion 906A of the substrate 906 that was removed from the region 924 of the surface 914 of the aircraft.

In one or more examples, the replacement substrate 1006 may have a shape and size that is substantially the same as the size of the portion 906A of the substrate that was removed. For example, the edges of the replacement substrate 1006 may mate and/or be in contact with edges of neighboring portions of the substrate 906. A seam 1020 or gap may be disposed between the remaining portion of the substrate 906 and the replacement substrate 1006. In one or more examples, a filler material may be applied to the seam 1020 to fill at least a portion of the seam 1020 between the replacement substrate 1006 and the original substrate 906. The filler material may be an adhesive, a grout, or grout-like material that may be applied to the gap or seam in order to seal, close and/or fill at least a portion of the seam 1020. For example, the filler material may close at least a portion of the seam 1020 such as to control an amount of fluid that may move through the seam 1020, to control and/or prevent flame penetration beyond the substrate 906 to the surface 914 of the aircraft, or the like.

FIGS. 12A-12C illustrate another example for replacing the degraded and removed portion 906A of the substrate shown in FIGS. 9 and 10, according to one example of the present disclosure. A replacement substrate 1106 may include a tactile portion 1112 and a mounting portion 1116. The tactile portion 1112 includes one or more tactile features having one or more attributes that are similar in relation to the one or more attributes of the tactile features of the portion 906A of the substrate that was removed from the surface 914 of the aircraft.

In the illustrated example, the mounting portion 1116 is positioned below or underneath the tactile portion 1112 and extends a distance away from at least one edge of the tactile portion 112. As shown in FIG. 12C, the mounting portion 1116 of the replacement substrate 1106 may be positioned below or underneath a neighboring portion 906B of the original substrate 906. For example, the mounting portion 1116 may slide under, extend underneath, and overlap with the neighboring portion 906B of the original substrate 906 in an interlocking arrangement. In the illustrated example, the mounting portion 1116 extends away from one edge of the tactile portion 1112 of the replacement substrate 1106. In alternative arrangements, the mounting portion 1116 may be sized and/or positioned relative to the tactile portion 1112 in order to extend away from two or more different edges of the tactile portion 1112, such as to slide under and/or interlock with two or more different neighboring portions of the substrate 906.

In one or more examples, the tactile portion 1112 of the replacement substrate 1106 may have a shape and size that is substantially the same as the size of the portion 906A of the substrate that was removed. For example, the edges of the tactile portion 1112 may mate and/or be in contact with edges of neighboring portions of the substrate 906. A seam or gap (not shown) may be disposed between the remaining portion of the substrate 906 and the replacement substrate 1106. In one or more examples, a filler material may be applied to the seam to fill at least a portion of the seam between the tactile portion 1112 of the replacement substrate 1106 and the original substrate 906. The filler material may be an adhesive, a grout, or grout-like material that may be applied to the gap or seam in order to seal, close and/or fill at least a portion of the seam. For example, the filler material may close at least a portion of the seam such as to control an amount of fluid that may move through the seam, to control and/or prevent flame penetration beyond the substrate 906 to the surface 914 of the aircraft, or the like.

Figure 14:
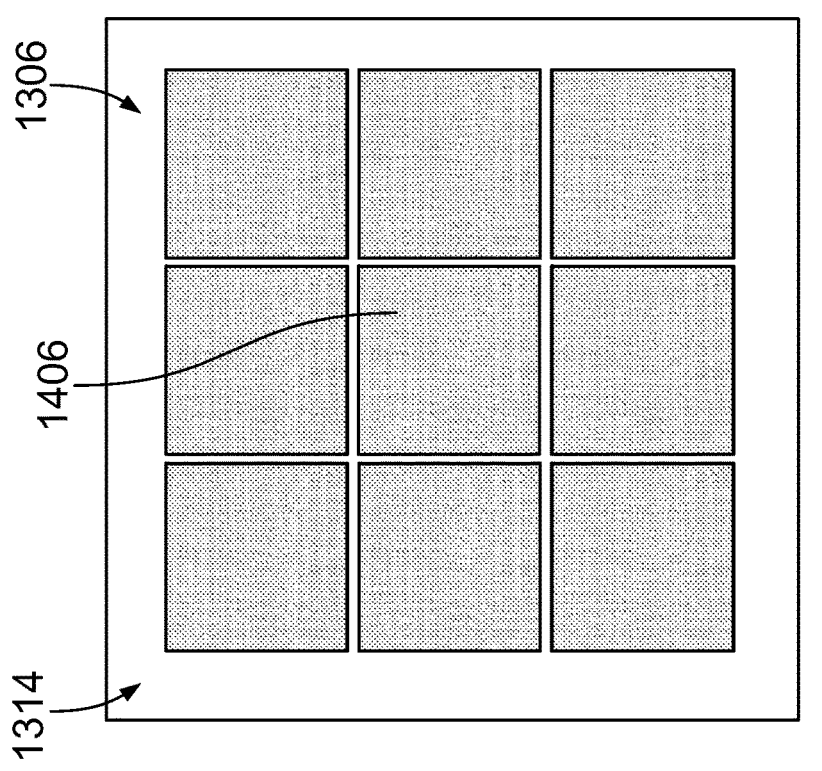
FIG. 14 illustrates a replacement substrate couples with a surface, according to an example of the present disclosure.
Figure 13:
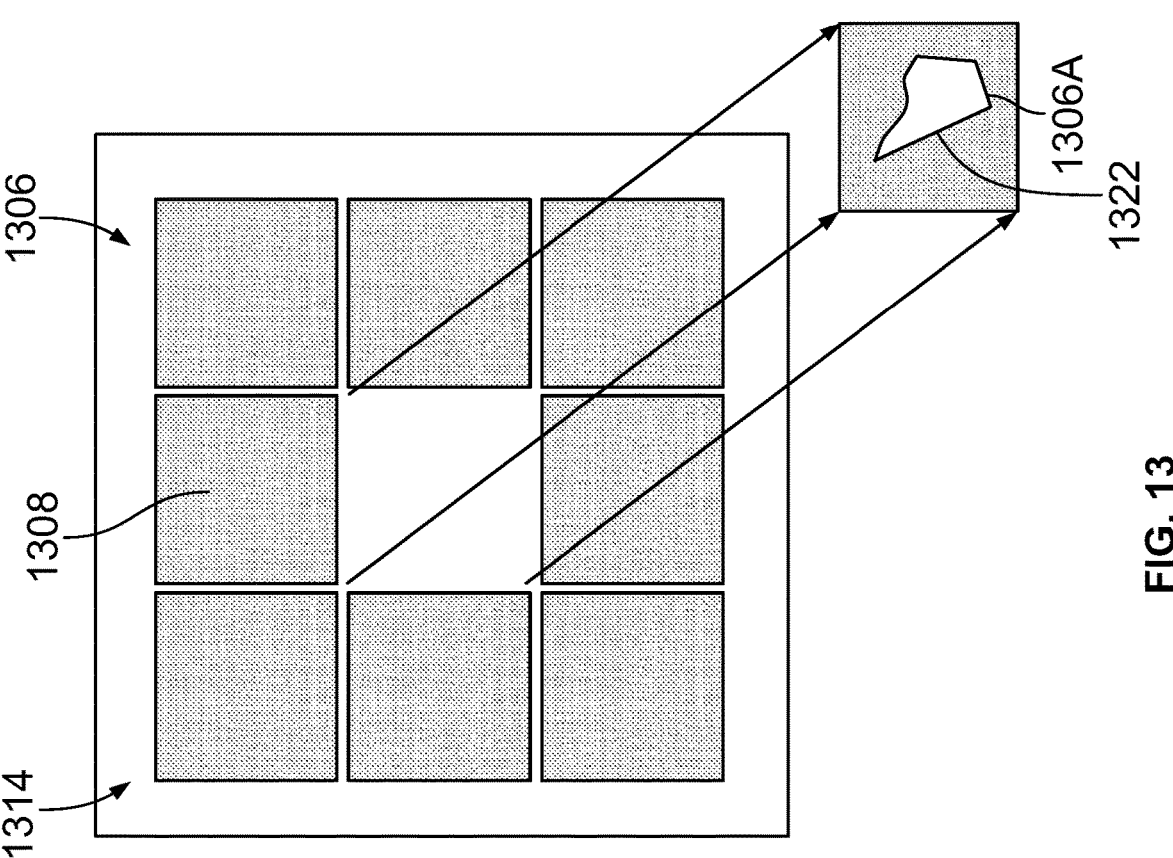
FIG. 13 illustrates a portion of a substrate on a surface to be replaced, according to an example of the present disclosure.

FIGS. 13 and 14 illustrate another example for replacing a degraded and removed portion of a substrate 1306, according to one example of the present disclosure. The substrate 1306 is coupled with a surface 1314 of an aircraft and includes tactile features that have been printed thereon. The substrate 1306 includes plural tiles 1308 that are arranged in a grid-like arrangement with a substantially uniform gap disposed between neighboring tiles of the substrate. The gaps may be smaller or larger relative to what is illustrated in FIGS. 13 and 14. As shown in FIG. 13, only the damaged portion 1306A of the substrate 1306 may be removed from the surface 1314 of the aircraft) and the non-degraded tiles of the remaining portion of the substrate 1306 may remain coupled with the surface 914 of the aircraft based on an area 1322 of the damaged portion 1306A degrading.

In the illustrated embodiment shown in FIG. 14, a replacement substrate 1406 may be coupled with the region of the surface 1314 of the aircraft via an adhesive and/or mechanical fastening mechanism. The replacement substrate 1406 may include one or more tactile features having one or more attributes that are similar in relation to the one or more attributes of the tactile features of the portion 1306A of the substrate 1306 that was removed from the surface 1314 of the aircraft. In one or more examples, a filler material may be applied to the gap or seam between the replacement substrate 1406 and one or more of the neighboring tiles 1308 of the original substrate 1306. The filler material may be an adhesive, a grout, or grout-like material that may be applied to the gap or seam in order to seal, close and/or fill at least a portion of the gap. For example, the filler material may close at least a portion of the gap such as to control an amount of fluid that may move through the gap, to control and/or prevent flame penetration beyond the substrate 1306 to the surface 1314 of the aircraft, or the like.

Figure 15:
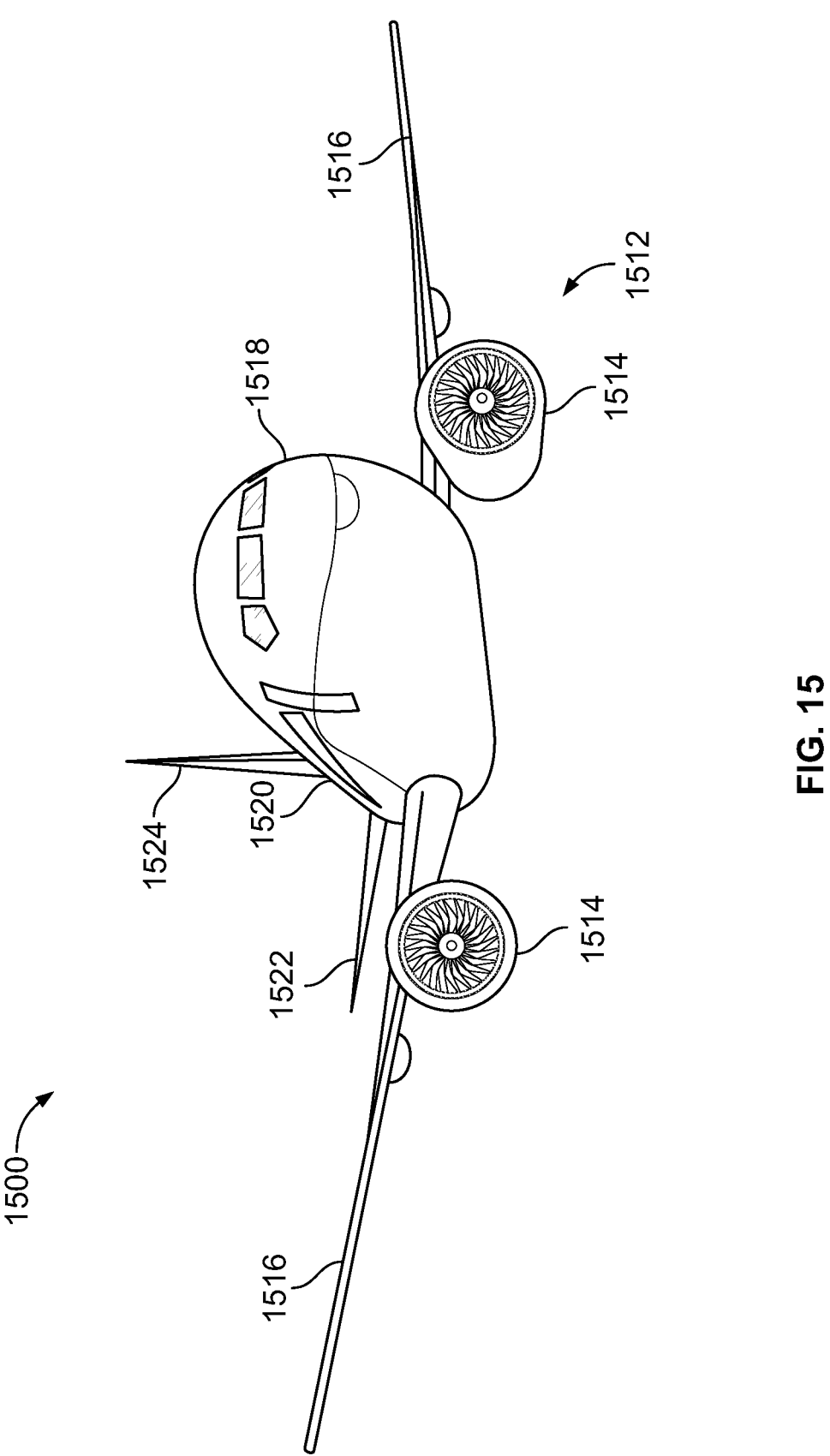
FIG. 15 illustrates a perspective front view of an aircraft, according to an example of the present disclosure.

FIG. 15 illustrates a perspective front view of an aircraft 1500, according to an example of the present disclosure. The aircraft 1500 includes a propulsion system 1512 that may include two turbofan engines 1514, for example. Optionally, the propulsion system 1512 may include more engines 1514 than shown. The engines 1514 are carried by wings 1516 of the aircraft 1500. In other examples, the engines 1514 may be carried by a fuselage 1518 and/or an empennage 1520. The empennage 1520 may also support horizontal stabilizers 1522 and a vertical stabilizer 1524.

The fuselage 1518 of the aircraft 1500 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and coach sections), and an aft section. Portions of the aircraft 1500, such as panels within the internal cabin, can be coupled with and/or receive a substrate having one or more tactile features printed thereon, as described herein.

Optionally, instead of an aircraft, examples of the present disclosure may be used with various other vehicles, such as automobiles, buses, locomotives and train cars, watercraft, spacecraft, and the like. As another example, methods and systems as described herein can be used to couple substrates having one or more tactile features (e.g., forming decorative tiles formed thereon) within buildings, articles of manufacture, or the like. As another example, portions of the substrate (e.g., degraded portions of the substrate, such as portions that are degraded due to normal wear and/or tear of the substrate, or the like) may be removed from a surface of a vehicle, a building, or the like, and a replacement substrate (e.g., having a substantially similar arrangement of tactile features and/or one or more similar attributes as the removed portion of the substrate) may be coupled with the surface of the vehicle or building in place of the removed portion of the substrate.

Figure 16:
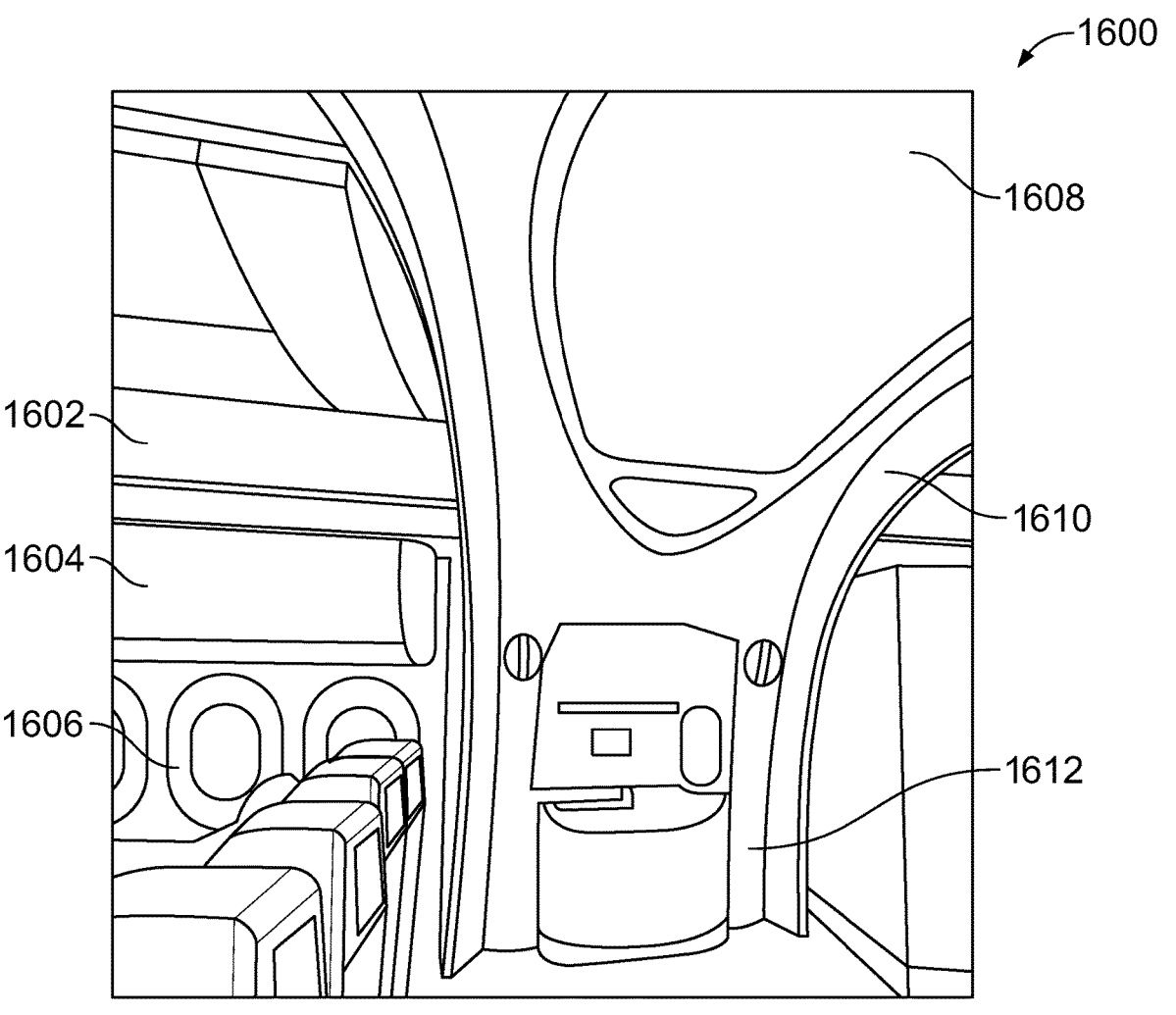
FIG. 16 illustrates a perspective internal view of an internal cabin of a vehicle, according to an example of the present disclosure.

FIG. 16 illustrates a perspective internal view of an internal cabin 1600 of a vehicle, (such as the aircraft 1500 shown in FIG. 15) according to an example of the present disclosure. The internal cabin 1600 includes numerous surfaces that may be coupled with and/or receive a substrate such as the substrate(s) described with respect to FIG. 4C, 6B, 8, or 9-14, or the like. For example, one or more substrates and/or one or more replacement substrates may be coupled with ceiling panels 1602, stowage bin assemblies 1604, sidewall panels 1606, ceiling coves 1608, doorway arch panels 1610, doorway side panels 1612, partitions, closets, lavatory walls, light valences, and/or the like, as described herein.

As described herein, examples of the present disclosure provide systems and methods of forming substrates having one or more tactile features, one or more attributes, one or more characteristics, or the like, that are configured to be coupled with one or more surfaces of a structure, such as a surface of an aircraft, for example. The substrates include the tactile features that may be formed onto the surface of the substrate through surface treatment of the substrate, such as printing. Examples of the present disclosure provide cost-effective substrates and time-effective methods of applying and/or replacing degraded substrates coupled with structures.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 120 may be or include one or more processors that are configured to control operation, as described herein.

The control unit 120 is configured to execute a set of instructions that are stored in one or more data storage units or elements (such as one or more memories), in order to process data. For example, the control unit 120 may include or be coupled to one or more memories. The data storage units may also store data or other information as desired or needed. The data storage units may be in the form of an information source or a physical memory element within a processing machine.

The set of instructions may include various commands that instruct the control unit 120 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 120 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Further, the disclosure comprises examples according to the following clauses:

Clause 1: a method comprising:
  coupling a substrate with a surface of an aircraft, wherein one or more tactile features are configured to be printed onto the substrate.

Clause 2: The method of clause 1, further comprising preparing the substrate to be coupled with the surface of the aircraft by:

forming one or more perforated features onto the substrate;

printing the one or more tactile features onto the substrate; and curing the one or more tactile features with ultraviolet (UV) light.

Clause 3: The method of clauses 1 or 2, further comprising preparing the substrate to be coupled with the surface of the aircraft by:

printing the one or more tactile features onto the substrate, wherein the one or more tactile features are configured to be arranged in groups of tactile features; and curing the one or more tactile features with ultraviolet (UV) light.

Clause 4: The method of clause 3, further comprising separating a first portion of the substrate including one of the groups of the tactile features from another portion of the substrate including one or more other groups of the tactile features.

Clause 5: The method of clause 3, wherein a first portion of the substrate includes a first group of tactile features having one or more first attributes, and a second portion of the substrate includes a second group of tactile features having one or more second attributes that differ in relation to the one or more first attributes.

Clause 6: The method of clause 5, further comprising:

coupling the first portion of the substrate including the first group of the tactile features with the surface of the aircraft at a first location of the aircraft; and coupling the second portion of the substrate including the second group of the tactile features with the surface of the aircraft at a second location of the aircraft.

Clause 7: The method of any of clauses 1-6, further comprising:

removing a portion of the substrate from a region of the surface of the aircraft; and coupling a replacement substrate with the region of the surface of the aircraft, the replacement substrate including one or more tactile features having one or more attributes that are similar in relation to one or more attributes of the one or more tactile features of the portion of the substrate that is removed from the region of the surface of the aircraft.

Clause 8: The method of clause 7, further comprising applying a filler material to a gap disposed between the substrate and the replacement substrate.

Clause 9: The method of clause 7, further comprising positioning the replacement substrate within the region of the surface of the aircraft to overlap with at least some of the substrate coupled with the surface of the aircraft.

Clause 10: The method of any of clauses 1-9, further comprising coupling the substrate with the surface of the aircraft via an adhesive material disposed between the surface of the aircraft and the substrate.

Clause 11: A system comprising:

a substrate configured to be coupled with a surface of an aircraft, the substrate including one or more tactile features configured to be printed onto the substrate.

Clause 12: The system of clause 11, wherein the substrate includes one or more perforated features.

Clause 13: The system of clauses 11 or 12, further comprising:

a printer including a print head; and a control unit configured to control the printer to form the one or more tactile features on the substrate, wherein the one or more tactile features are arranged in groups of tactile features on the substrate.

Clause 14: The system of clause 13, wherein a first portion of the substrate including one of the groups of the tactile features is configured to be separated from another portion of the substrate including one or more other groups of the tactile features.

Clause 15: The system of clause 13, wherein a first portion of the substrate includes a first group of the tactile features having one or more first attributes, and a second portion of the substrate includes a second group of the tactile features having one or more second attributes that differ in relation to the one or more first attributes.

Clause 16: The system of clause 15, wherein the first portion of the substrate including the first group of the tactile features is configured to be coupled with the surface of the aircraft at a first location of the aircraft, and the second portion of the substrate including the second group of the tactile features is configured to be coupled with the surface of the aircraft at a second location of the aircraft.

Clause 17: The system of any of clauses 11-16, wherein a portion of the substrate is configured to be removed from a region of the surface of the aircraft, and a replacement substrate is configured to be coupled with the region of the surface of the aircraft, wherein the replacement substrate includes one or more tactile features having one or more attributes that are similar in relation to one or more attributes of the one or more tactile features of the portion of the substrate that is removed from the region of the surface of the aircraft.

Clause 18: The system of clause 17, wherein a filler material is configured to be applied to a gap disposed between the substrate and the replacement substrate.

Clause 19: The system of clause 17, wherein the replacement substrate is configured to be positioned within the region of the surface of the aircraft to overlap with at least some of the substrate coupled with the surface of the aircraft.

Clause 20: A method, comprising:

coupling a substrate with a surface of an aircraft, wherein one or more tactile features are configured to be printed onto the substrate;

removing a portion of the substrate from a region of the surface of the aircraft, wherein one or more of a shape or a size of the portion of the substrate is based at least in part on a location of one or more perforated features of the substrate; and coupling a replacement substrate with the region of the surface of the aircraft, the replacement substrate including one or more tactile features having one or more attributes that are similar in relation to one or more attributes of the one or more tactile features of the portion of the substrate that is removed from the region of the surface of the aircraft.

As described herein, examples of the present disclosure provide efficient decorative substrates that may be coupled with and/or removed from a surface of an aircraft. Further, examples of the present disclosure provide efficient methods of preparing and forming the substrates, coupling the substrates with the surface of the aircraft, removing portions of the substrates, and replacing the removed portions of the substrates with replacement substrates having one or more attributes that are similar in relation to attributes of the removed portions of the substrates. Additionally, examples of the present disclosure provide methods of removing and replacing portions of the substrates that are faster than conventional methods of using sheets of decorative laminates to cover large surfaces of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

16

What is claimed is:

1. A method comprising:
coupling a substrate with a surface of an aircraft, wherein one or more tactile features are printed onto the substrate, the substrate including one or more perforated features formed onto the substrate, wherein portions of the substrate are configured to be removed from the surface of the aircraft based at least in part on locations of the one or more perforated features.

2. The method of claim 1, further comprising preparing the substrate to be coupled with the surface of the aircraft by:
forming the one or more perforated features onto the substrate;
printing the one or more tactile features onto the substrate; and
curing the one or more tactile features with ultraviolet (UV) light.

3. The method of claim 1, further comprising preparing the substrate to be coupled with the surface of the aircraft by:
printing the one or more tactile features onto the substrate, wherein the one or more tactile features are configured to be arranged in groups of tactile features; and
curing the one or more tactile features with ultraviolet (UV) light.

4. The method of claim 3, further comprising separating a first portion of the substrate including one of the groups of the tactile features from another portion of the substrate including one or more other groups of the tactile features.

5. The method of claim 3, wherein a first portion of the substrate includes a first group of tactile features having one or more first attributes, and a second portion of the substrate includes a second group of tactile features having one or more second attributes that differ in relation to the one or more first attributes.

6. The method of claim 5, further comprising:
coupling the first portion of the substrate including the first group of the tactile features with the surface of the aircraft at a first location of the aircraft; and
coupling the second portion of the substrate including the second group of the tactile features with the surface of the aircraft at a second location of the aircraft.

7. The method of claim 1, further comprising:
removing a portion of the substrate from a region of the surface of the aircraft, wherein one or more of a shape or a size of the portion of the substrate is based at least in part on the locations of the one or more perforated features of the substrate; and
coupling a replacement substrate with the region of the surface of the aircraft, the replacement substrate including one or more tactile features having one or more attributes that are similar in relation to one or more attributes of the one or more tactile features of the portion of the substrate that is removed from the region of the surface of the aircraft.

8. The method of claim 7, further comprising applying a filler material to a gap disposed between the substrate and the replacement substrate.

9. The method of claim 7, further comprising positioning the replacement substrate within the region of the surface of the aircraft to overlap with at least some of the substrate coupled with the surface of the aircraft.

10. The method of claim 1, further comprising coupling the substrate with the surface of the aircraft via an adhesive material disposed between the surface of the aircraft and the substrate.

11. A method, comprising:

coupling a substrate with a surface of an aircraft, wherein one or more tactile features are printed onto the substrate;

removing a portion of the substrate from a region of the surface of the aircraft, wherein one or more of a shape or a size of the portion of the substrate is based at least in part on a location of one or more perforated features of the substrate; and coupling a replacement substrate with the region of the surface of the aircraft, the replacement substrate including one or more tactile features having one or more attributes that are similar in relation to one or more attributes of the one or more tactile features of the portion of the substrate that is removed from the region of the surface of the aircraft.

\* \* \* \* \*